Nov. 19, 1946.  S. F. ARMINGTON  2,411,408
FRAME FOR CRAWLER TRACKS
Filed July 5, 1943  2 Sheets-Sheet 1

INVENTOR.
STEWART F. ARMINGTON
BY
Hyde and Meyer
ATTORNEYS

Nov. 19, 1946. S. F. ARMINGTON 2,411,408
FRAME FOR CRAWLER TRACKS
Filed July 5, 1943 2 Sheets-Sheet 2

INVENTOR.
STEWART F. ARMINGTON
BY Hyde and Meyer.
ATTORNEYS

Patented Nov. 19, 1946

2,411,408

UNITED STATES PATENT OFFICE 2,411,408

FRAME FOR CRAWLER TRACKS

Stewart F. Armington, Willoughby, Ohio, assignor to The Euclid Road Machinery Co., Euclid, Ohio, a corporation of Ohio Application July 5, 1943, Serial No. 493,555

5 Claims. (Cl. 305—4)

This invention relates to improvements in a frame for a crawler track.

Among the objects of the present invention are the provision of a frame of very strong construction for an endless track adapted to carry very heavy loads and means for keeping the track comparatively clean. The details of a preferred form for carrying out these purposes is shown in the accompanying drawings and the essential features thereof will be summarized in the appended claims.

Figure 1:
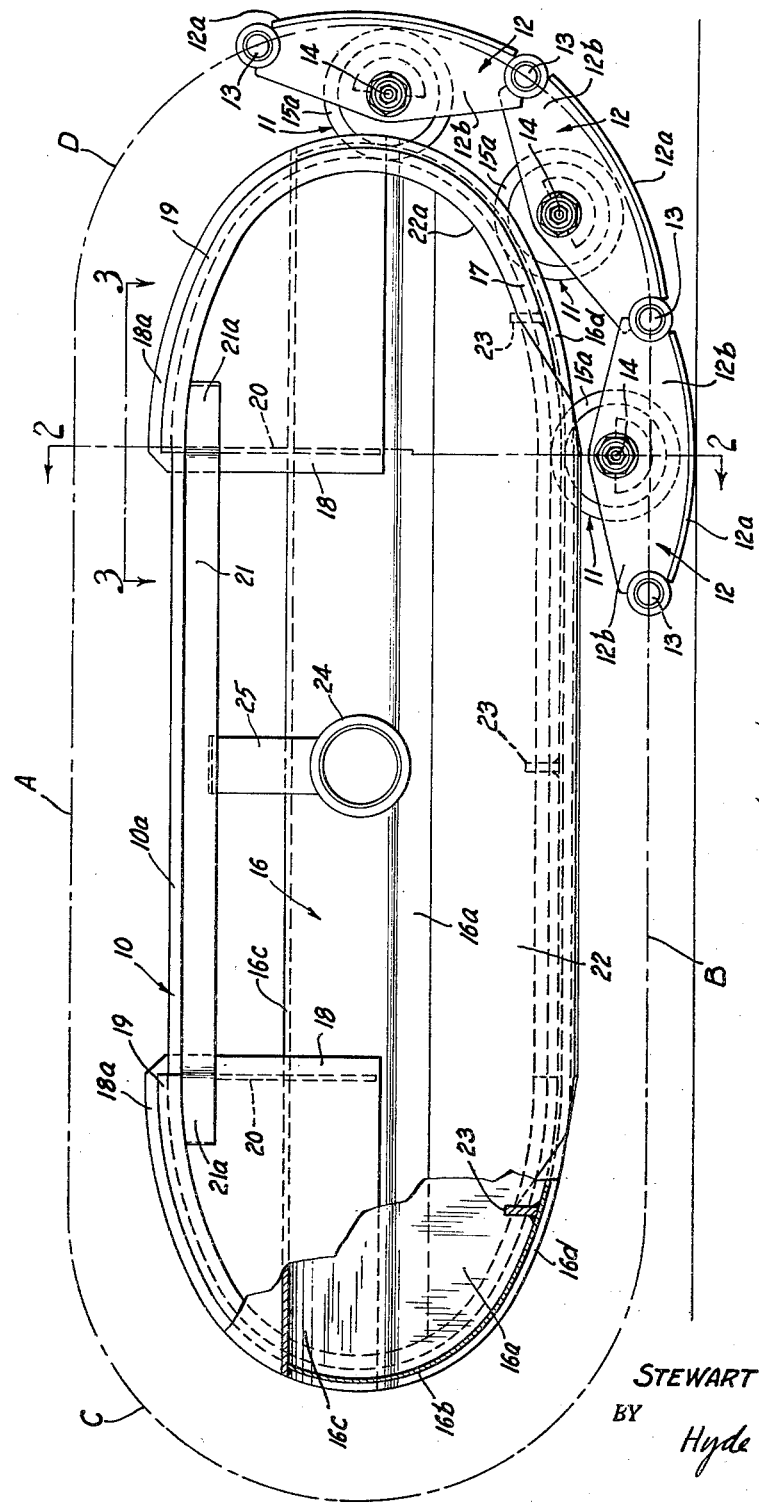
Figure 2:
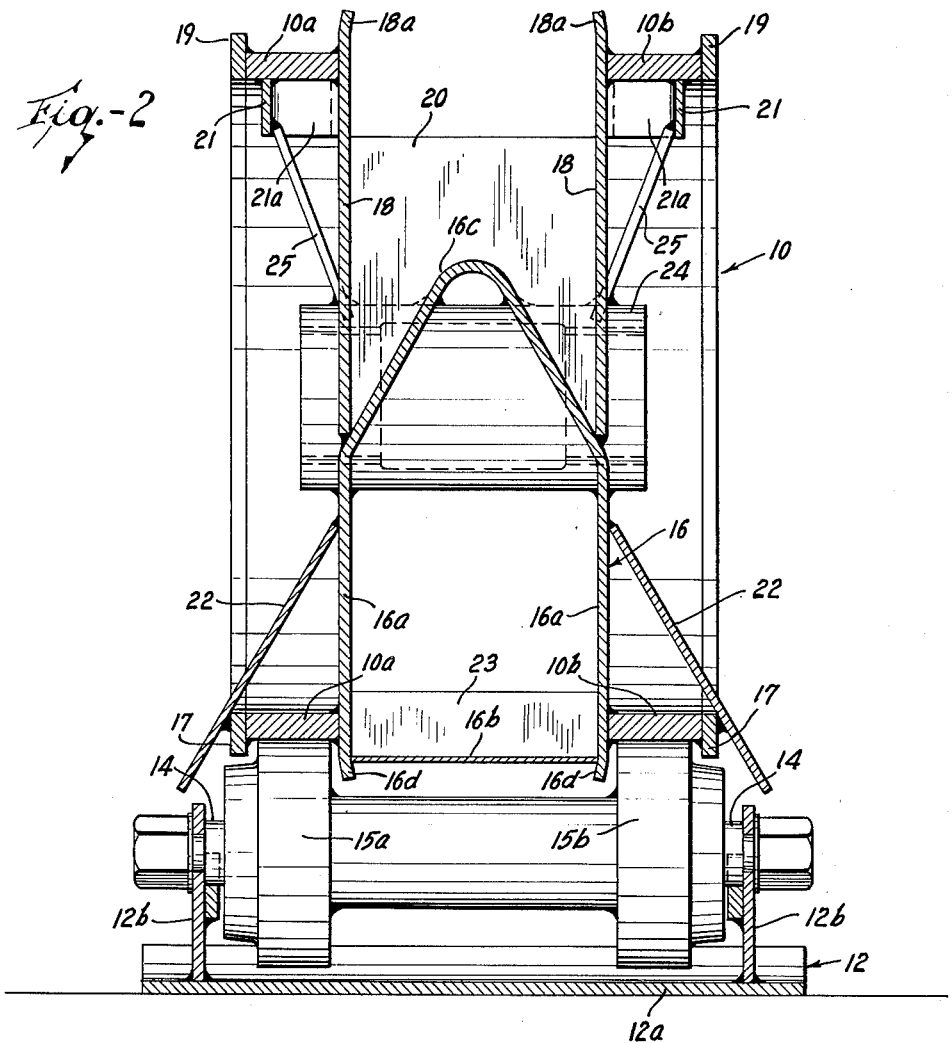
Figure 3:
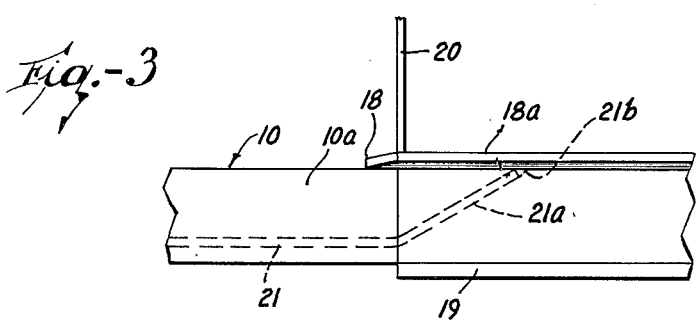

In the drawings Fig. 1 is a side elevational view of a track embodying my device, with a portion of the frame broken away to more clearly indicate the construction; Fig. 2 is an enlarged transverse sectional view taken along the line 2—2 of Fig. 1; while Fig. 3 is an enlarged fragmental view taken in approximately the position indicated by line 3—3 of Fig. 1.

The track here disclosed is of the type described and claimed in Letters Patent Re. 21,953, granted November 18, 1941, to Harry Law, but it will be understood that certain features of my invention are applicable to other types of track. In Fig. 1 I have indicated an endless guide rail or track 10 extending in a generally elliptical form in a fore-and-aft direction and providing means by which a vehicle travels on rollers 11, which in turn are rotatably mounted in shoes 12 which are fastened together by link pins 13 to provide an endless track. In this special form of track the link pins travel along a path comprising the straight top and bottom portions A and B which are tangent to the perfect semicircle end portions C and D as taught in the aforesaid Law patent. In the present form of my device, as clearly appears in Fig. 2, the guide rail or track 10 is composed of two parallel portions 10a and 10b, and certain advantages are derived from this arrangement, as will presently appear.

Each shoe 12 comprises a base portion 12a and parallel upstanding side portions 12b. At some point in the side portions intermediate the link pins 13 (in the present form midway between the pins) the side portions are apertured to receive support means for a shaft 14 which carries a pair of rollers 15a and 15b. It will be understood therefore that the rollers are rotatably mounted in the shoe. These rollers are spaced apart so that they are in alinement with the guide rails 10a and 10b.

The frame is rendered extremely strong by a large box beam 16 which extends from end to end of the track 10 and which is of irregular five-sided construction when viewed in section, as shown in Fig. 2. This box beam comprises side walls 16a, a bottom 16b, and a top wall 16c which is of generally inverted V shape. The lower runs of the guide rails 10a and 10b are welded directly to the beam walls 16a. As clearly shown in Fig. 2, these walls extend below the guide rail or track providing the flanges 16d which aid in holding the rollers in position on the track. Along the outer walls of this lower run of the track are other flanges 17 which perform a similar function on the outside of the track. The curved ends of the tracks or guide rails, as to their upper half portions, are mounted on the frame by means of plates 18 of quarter elliptical form. These plates are welded to the beam 16 in alinement with the sides 16a, as best seen in Fig. 2. The plates 18 extend above the upper reaches of the guide rails 10a and 10b, providing flanges 18a, which aid in holding the rollers on the track as they round the ends. Outside flanges 19 are provided similar to the flanges 17 already described. The plates 18 are further strengthened by tie plates 20 which extend transversely of the frame near the inner ends of plates 18. These tie plates are welded to the plates 18 and also to the top wall 16c of the beam 16.

Strengthening means is provided for the upper rails 10a and 10b intermediate the ends of the frame. As best seen in the various views, this comprises a web 21 extending downwardly beneath each guide rail at right angles thereto and connected therewith by welding. The ends of these web members are bent over as most clearly shown at 21a in Fig. 3 and welded to plates 18 at the points 21b.

Further means for strengthening the frame and for keeping the track clean is provided by means of the skirt plates 22, one at each side of the beam 16 and running for the full length of the frame. As best seen in Fig. 1, the ends of these plates are cut at 22a to follow the curve of the track 10. These skirt plates are welded at the top to the side walls 16a of the beam 16 and at the bottom are welded to the flanges 17, which in turn are welded to the lower portions of the guide rails 10a and 10b. It is thus apparent that the skirt plates aid in providing a very strong support for the lower portions of the guide rails 10a and 10b. At the same time these guide rails and skirt plates together with the beam portions 16a provide triangular hollow beams parallel to the main beam 16 and reinforcing the same.

Further stiffening means is provided along the lower portion of the track by cross tie members 23, three of these being shown in Fig. 1. These are welded to the bottom plate 16b and to the side beam portions 16a. It will be noted in Fig. 1 that the plate 16b has its ends carried up and cut so as to completely closes the opposite ends of beam 16. This makes a very strong construction and keeps dirt from entering the beam.

Means is provided for mounting a vehicle on the crawler track assembly here disclosed. In the present form a bearing sleeve 24 is mounted intermediate the ends of the frame and extending transversely of the track. This sleeve is a tubular member extending through a corresponding hole in the beam 16 and the beam and sleeve are welded together at their various points of contact. Additional support is provided by the braces 25 which extend from the ends of the sleeve upwardly and outwardly to the web plates 21 where the braces are welded.

It will be apparent from the above description that I have provided a very strong frame and one which will keep the track continuously cleaned as the vehicle moves over loose dirt or other similar material. The spaced parallel upper reaches of the track 10 permit dirt to fall away from the shoe 12 as they traverse the idle or return stretch of the track. The mid portion of the upper reach of the track or guide rail is free of obstruction in the central portion of the frame, in other words, between the limits of the end flanges 18a and 19, as clearly shown in Fig. 1. As the rollers 11 ride along this portion of the track dirt is free to fall downwardly and hits the shed portion 16c of the main beam. As the dirt continues downwardly along the sloping sides of this beam it falls off on the skirt plates 22 and is directed further downwardly and outwardly to the ground. It will be noted that the skirt plates 22 extend beyond the parallel side portions 12b of the track shoes and are approximately as low as the top of these side portions so that dirt is prevented from dropping into the shoes and dirt and rocks are prevented from being forced into the shoes from the sides as the crawler track is twisted in making sharp turns during the usual operation of the vehicle. This is an important feature with this type of track, which is adapted to carry heavy loads at speeds which are greater than those customarily met with.

What I claim is:

1. Track construction comprising a frame, an endless crawler track on said frame, said frame comprising parallel guide rails for said track where it engages the ground, said frame having a dirt shed of inverted V section extending lengthwise of said frame, and a plate on each side of said dirt shed extending downwardly and outwardly therefrom, said plates being rigidly connected with said dirt shed and each of said plates at its lower end supporting one of said parallel guide rails.

2. In a crawler device having an elongated frame, having an endless crawler track on said frame, and wherein said track comprises a plurality of shoes linked together, each shoe carrying a pair of associated rollers located between the shoe and said frame and said rollers being spaced apart transversely of said frame, the combination of said frame having endless parallel guide rails engaging said rollers throughout their path of travel, said guide rails having upper and lower runs, said frame having a dirt shed of inverted V section extending lengthwise of said frame below said upper run and between the parallel guide rails thereof, and a plate welded to each side of said dirt shed extending downwardly and outwardly therefrom, and each of said plates near its lower end being welded to the outer edge of one of said guide rails along said lower run.

3. In a crawler device having an elongated frame, having an endless crawler track on said frame, and wherein said track comprises a plurality of shoes linked together, each shoe carrying a pair of associated rollers located between the shoe and said frame and said rollers being spaced apart transversely of said frame, the combination of said frame having endless parallel guide rails engaging said rollers throughout their path of travel, said guide rails having upper and lower runs, said frame having substantially parallel and substantially vertical plates extending from end to end thereof, each plate respectively welded near its lower end to the inner edge of one of said guide rails along its lower run, a top cover of inverted V section connecting the upper edges of said vertical plates, and support means for the upper run of said guide rail welded to said frame and extending above said top cover.

4. Track construction comprising an endless crawler track, an endless guide rail of generally elliptical form engaging said track to guide it, a box beam extending generally horizontally through the central portion of said elliptical form and rigidly connected between the opposite rounded ends of said guide rail, said box beam having generally vertical side walls, and said guide rails lying wholly laterally outside of said walls extended, whereby said box beam extends into immediate supporting position adjacent said rounded ends of said guide rail.

5. Track construction comprising an endless crawler track, an endless guide rail of generally elliptical form engaging said track to guide it, a box beam extending generally horizontally through the central portion of said elliptical form and rigidly connected with opposite ends of said guide rail, said box beam having generally vertical side walls, bottom runs of said guide rails extending laterally outwardly from said side walls, skirt plates extending inwardly and upwardly from the outer edges of said guide rail runs to said side walls, and said skirt plates, guide rails and side walls being rigidly joined together to form a hollow plate construction triangular in section.

STEWART F. ARMINGTON.